US009752628B2

(12) United States Patent
Langhorst et al.

(10) Patent No.: US 9,752,628 B2
(45) Date of Patent: Sep. 5, 2017

(54) SELF-LOCKING CLUTCH MECHANISM

(71) Applicant: GATES CORPORATION, Denver, CO (US)

(72) Inventors: Benjamin R. Langhorst, Beverly Hills, MI (US); Dean Schneider, Washington, MI (US); Alexander Serkh, Troy, MI (US)

(73) Assignee: Gates Corporation, Denver, CO (US)

( * ) Notice: Subject to any disclaimer, the term of this patent is extended or adjusted under 35 U.S.C. 154(b) by 26 days.

(21) Appl. No.: 14/959,731

(22) Filed: Dec. 4, 2015

(65) Prior Publication Data

US 2017/0159728 A1 Jun. 8, 2017

(51) Int. Cl.
*F16D 41/20* (2006.01)
*F16D 13/08* (2006.01)
*F16D 121/14* (2012.01)

(52) U.S. Cl.
CPC ........... *F16D 41/206* (2013.01); *F16D 13/08* (2013.01); *F16D 2121/14* (2013.01)

(58) Field of Classification Search
None
See application file for complete search history.

(56) References Cited

U.S. PATENT DOCUMENTS

| 4,702,340 | A | * | 10/1987 | Hamilton | ................. B62M 7/02 180/219 |
| 5,909,791 | A | * | 6/1999 | DiStefano | ............. F16D 41/206 192/223.4 |
| 6,375,588 | B1 | | 4/2002 | Frankowski et al. | |
| 6,394,248 | B1 | | 5/2002 | Monahan et al. | |
| 6,877,597 | B2 | | 4/2005 | Bach et al. | |
| 7,507,172 | B2 | | 3/2009 | Lehtovaara et al. | |
| 7,789,464 | B2 | | 9/2010 | Stemmer et al. | |
| 7,874,950 | B2 | | 1/2011 | Lehtovaara et al. | |
| 2006/0068962 | A1 | | 3/2006 | Allsopp | |
| 2012/0298474 | A1 | * | 11/2012 | Ward | ...................... F16D 7/022 192/41 S |
| 2016/0333987 | A1 | * | 11/2016 | Tran | ....................... B60K 25/02 |

FOREIGN PATENT DOCUMENTS

WO    WO2015/103697    *    7/2015

* cited by examiner

*Primary Examiner* — Mark Manley
(74) *Attorney, Agent, or Firm* — Jeffrey A. Thurnau, Esq.; Paul N. Dunlap, Esq.

(57) ABSTRACT

A self-locking clutch mechanism comprising a base, an output member journalled to the base, a first spring engaged between the base and the output member, the first spring exerting a first spring force in a first direction, a clutch spring engaged with an intermediate member and frictionally engaged with a base cylindrical surface, an input member rotationally engaged with the base, the input member intermittently engagable with the clutch spring through a control member such that the clutch spring is temporarily released from the base cylindrical surface upon a rotary movement of the control member in a first direction, the intermediate member rotates upon release of the clutch spring from the base cylindrical surface, and a second spring engaged between the intermediate member and the output member, the second spring exerting a second spring force opposite the first spring force.

6 Claims, 5 Drawing Sheets

SELF-LOCKING CLUTCH MECHANISM

FIELD OF THE INVENTION

The invention relates to a self-locking clutch mechanism, and more particularly, to a self-locking clutch mechanism having an adjustable wrap spring.

BACKGROUND OF THE INVENTION

The invention relates to self-locking clutch mechanisms. Various mechanisms utilize wrap springs to frictionally engage a cylindrical surface. However, the reaction point of the wrap spring is fixed thereby defeating adjustment of the mechanism in response to changes in clutch load, component wear and orientation.

Representative of the art is U.S. Pat. No. 6,877,597 which discloses a clutch mechanism for seating units of the type having an adjustable support member. The clutch mechanism includes a housing having first and second opposite ends, and a generally cylindrical inner sidewall. A clamp member is movably interconnected with the housing, and the clamp member is adapted to secure the housing to a frame member of a seating unit. A rotor is rotatably mounted within the housing, and the rotor has a generally cylindrical outer surface. The rotor defines an axis of rotation, and has a channel with opposed sidewalls in the cylindrical outer surface extending generally parallel to the axis. A handle extends from the rotor, and a pulley is rotatably interconnected with the rotor. The pulley has an annular groove and an extension disposed in the channel of the rotor. The pulley is adapted to be operably coupled to an adjustable support member of a seating unit to provide adjustment of the support member. A coil spring is disposed around the rotor, and has opposite ends disposed in the channel adjacent the opposed sidewalls with the extension of the pulley position between the opposite ends. The coil spring frictionally engages the cylindrical inner sidewall and prevents rotation of the pulley relative to the housing when a rotational force is applied to the pulley. The sidewalls of the channel of the rotor engage the opposite ends of the coil spring and generate tension on the coil spring in a manner tending to reduce friction between the coil spring and the housing to permit rotation of the rotor and pulley relative to the housing when a force is applied to the handle.

What is needed is an adjustable self-locking clutch mechanism having an adjustable wrap spring. The present invention meets this need.

SUMMARY OF THE INVENTION

The primary aspect of the invention is to provide an adjustable self-locking clutch mechanism having an adjustable wrap spring.

Other aspects of the invention will be pointed out or made obvious by the following description of the invention and the accompanying drawings.

The invention comprises a self-locking clutch mechanism comprising a base, an output member journalled to the base, a first spring engaged between the base and the output member, the first spring exerting a first spring force in a first direction, a clutch spring engaged with an intermediate member and frictionally engaged with a base cylindrical surface, an input member rotationally engaged with the base, the input member intermittently engagable with the clutch spring through a control member such that the clutch spring is temporarily released from the base cylindrical surface upon a rotary movement of the control member in a first direction, the intermediate member rotates upon release of the clutch spring from the base cylindrical surface, and a second spring engaged between the intermediate member and the output member, the second spring exerting a second spring force opposite the first spring force.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
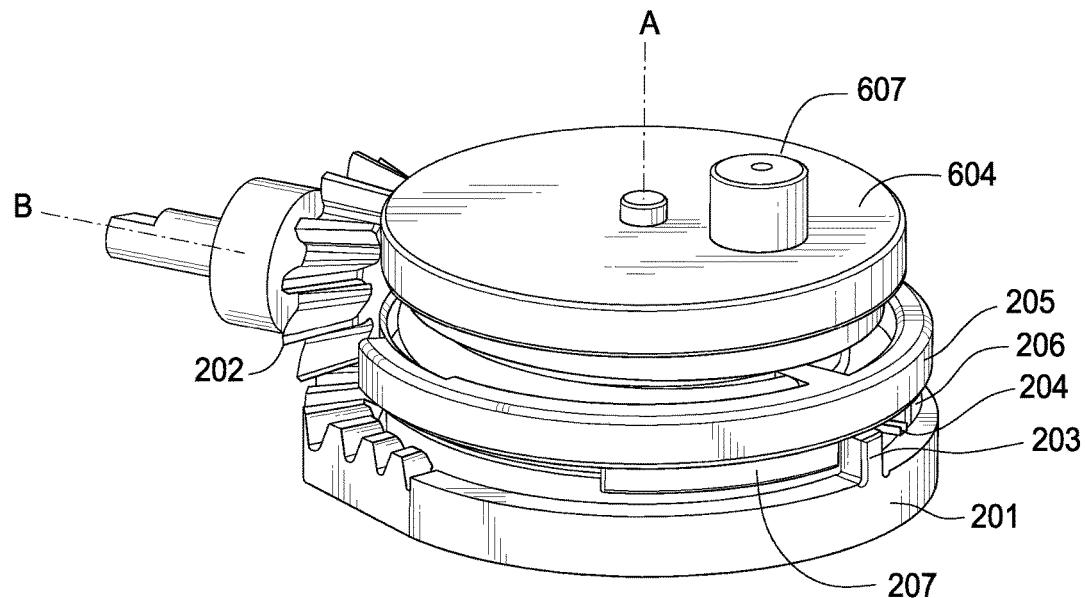
FIG. 1 is a perspective view of the device.

FIG. 1 is a perspective view of the device. The present invention features an input member (202), an intermediate member (205), a fixed base (301), and a wrap spring (302) that connects the fixed base to the intermediate member. The intermediate member is constrained to rotate around axis "A" relative to the fixed base (301). The input member is constrained to the same fixed base but rotates about an axis "B". Rather than drive the output member directly, the rotating input drive engages a control member. The control member in-turn controls the state and position of a locking wrap spring mechanism which in turn controls the position of the output member.

The wrap spring has two ends. One end is fixed to the intermediate member. If the input member is disengaged from a torque load and the intermediate member is loaded in one direction (for example, counterclockwise in the present embodiment), the intermediate member pushes the connected end of the wrap spring such that it causes the wrap spring volutes to open up and thereby increase the diameter of the wrap spring. The wrap spring is engaged by radially outward expansion with an inner cylindrical surface of the base, so this action increases the frictional clamping force with which the wrap spring grips the base.

If the input member is disengaged from a torque load and the intermediate member is loaded in an opposite direction (for example, clockwise in the present embodiment), the intermediate member rotates the connected end of the wrap spring such that it causes the wrap spring volutes to tighten inward and therefore decrease the diameter of the spring. This reduces the frictional grip the wrap spring exerts on the inner surface of the base, thereby allowing the wrap spring and intermediate member to rotate relative to the base.

In order for the input member to control motion of the intermediate member and also control wrap spring lock up, the input member drives a control member. The control member comprises a tab that either a) engages a wrap spring tab, or b) the intermediate member directly. If the control member is rotated in one direction, the tab at the end of the wrap spring is contacted and pushed in a direction that causes the wrap spring volutes to wrap tighter and thereby progressively release the frictional grip on the inner surface or the base. In this state, the control member can be actuated to engage the wrap spring further until one of two events occurs: (a) the wrap spring transmits enough torque through its wire and to the intermediate member to cause the intermediate member to rotate relative to the base, or (b) the wrap spring deflects until the control member tab directly engages with the intermediate member. When one of these events occurs, a torque path is formed from the input member to the intermediate member through the control member (and possibly through the wrap spring), and the intermediate member is forced to rotate relative to the base.

When a driving torque from the input member via the control member is no longer present, the intermediate member ceases to rotate relative to the fixed base. The wrap spring is also permitted to relax when it is no longer subject to a torque load from the control member, thereby locking the wrap spring to the inner surface of the base. Thus if the control member is driven by the input member into a neutral position where it is not exerting torque on the wrap spring or the intermediate member, then the entire assembly will then return to a locked state in the new position where the wrap spring will resist load from the intermediate member in one direction and prevent loading of the intermediate member in the other direction.

At this point, the self-locking mechanism will have been driven in one direction from one locked state to a second locked state. In the either of the two locked states the self-locking mechanism will be locked against any torque that may be applied back through the output member. During the transition between the two locked states, the self-locking mechanism is released, the state is changed, and the self-locking mechanism re-engaged—all by changing the position of the control member. A high-efficiency drive system (e.g. spur gears) can be used to drive the change in states with minimal frictional energy losses.

In order for the input member to control motion of the intermediate member in the opposite direction, the control member tab engages the intermediate member directly. When the input member drives the control member in said opposite direction, the control member tab does not contact the wrap spring, but rather directly engages the intermediate member because it will be moving away from the wrap spring. When torque is applied from the control member to the intermediate member in said direction, the intermediate member will turn the connected end of the wrap spring such that it causes the wrap spring volutes to tighten thereby reducing the diameter of the spring. This reduces the grip of the wrap spring with the inner surface of the base, and the wrap spring and intermediate member are then able to rotate relative to the base.

When driving torque from the input member via the control member is no longer present, the intermediate member no longer moves relative to the base. The wrap spring returns to the relaxed or unloaded state frictionally gripping the inner surface of the base. The entire assembly will again be in a locked state where the wrap spring will resist load from the intermediate member in one direction and prevent load transfer from the intermediate member in the other direction.

Figure 2:
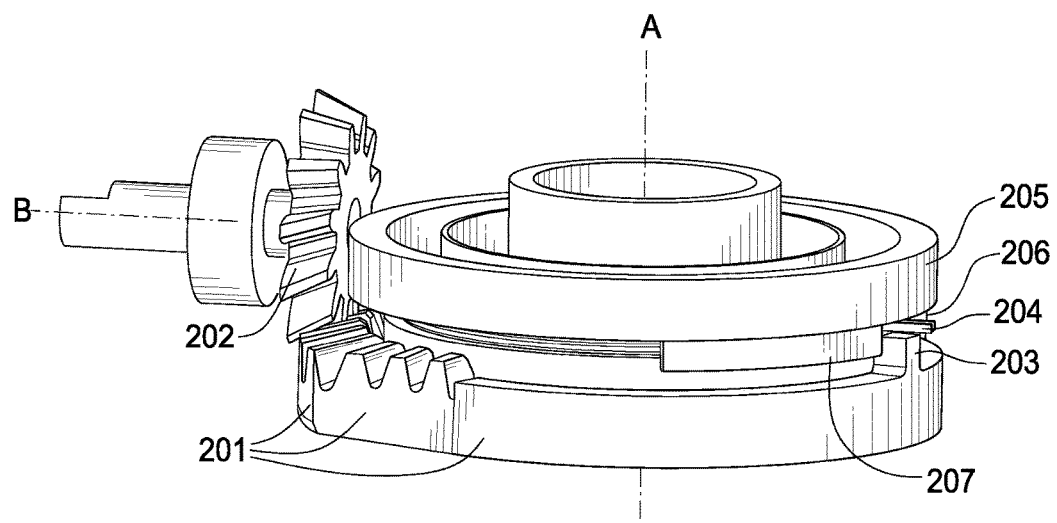
FIG. 2 is a perspective view of the device.

FIG. 2 is a perspective view of the device. Control member (201) is driven by the input member (202). Control member tab (203) is positioned between the wrap spring tang (204) and a member (207) on the intermediate member (205). When control member (201) rotates so that tab (203) moves counterclockwise, tab (203) first engages wrap spring tang (204) which causes wrap spring (302) to wind tighter and release its grip on base cylindrical surface (303).

As control member (201) rotates further, wrap spring tang (204) is pressed against member (206) which causes rotation of intermediate member (205) into a new position relative to base (301). On the other hand, if control member (201) rotates clockwise tab (203) contacts member (207). Intermediate member (205) is attached to end (402) of the wrap spring. When driven by control member (201), member (205) causes wrap spring (302) to wind tighter and release its grip on base cylindrical surface (303) which then permits relative rotation of the control member (201) with respect to base (301).

Figure 3:
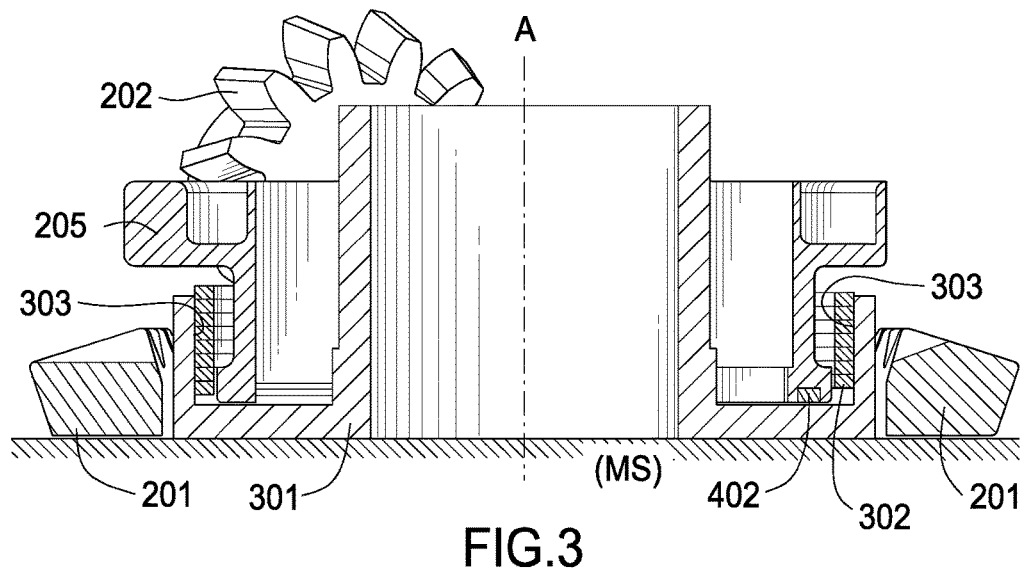
FIG. 3 is a cross-sectional view of the device.

FIG. 3 is a cross-sectional view of the device. Base (301) does not rotate during operation of the device and can be mouted to a mouting surface (MS). Intermediate member (205) can rotate through a partial arc relative to base (301). Control member (201) is rotated by input member (202). Wrap spring (302) is engaged between intermediate member (205) and base surface (303).

Figure 4:
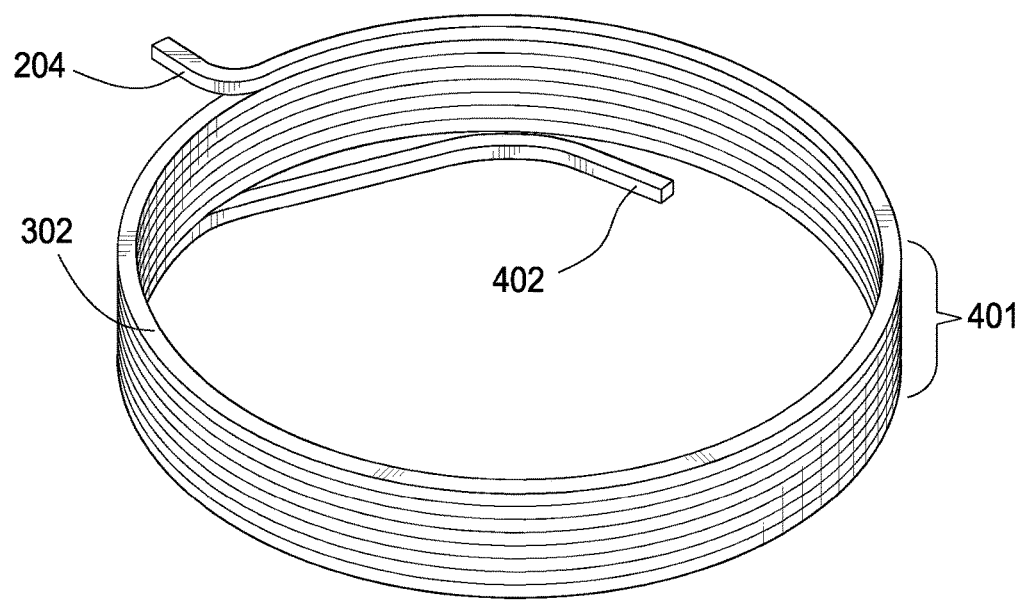
FIG. 4 is a perspective view of the wrap spring.

FIG. 4 is a perspective view of the wrap spring. Wrap spring (302) comprises a plurality of volutes or coils (401) and two ends. One end (204) extends radially outward whereby it can be engaged by tab (203). End (402) engages intermediate member (205).

Figure 5:
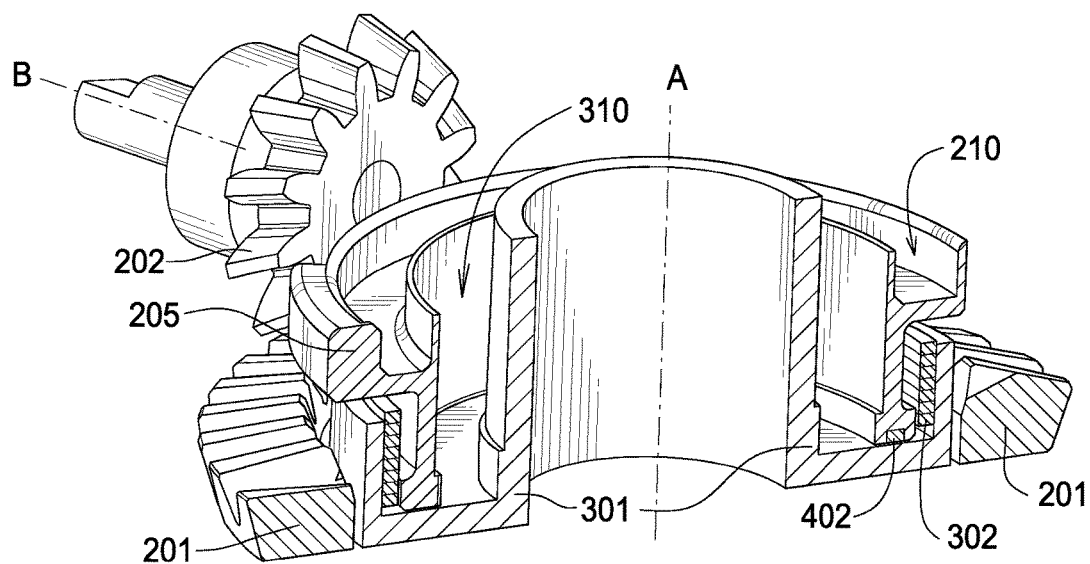
FIG. 5 is a perspective cross-sectional view of the device.

FIG. 5 is a perspective cross-sectional view of the device. The position of intermediate member (205) is influenced by three torques: one torque from the intermediate load applied to output member portion (607), one torque from an end of the wrap spring (302), and one torque from the control member tab (203). Wrap spring (302) is installed with an interference fit with base (301) so that a large amount of friction at the interface between wrap spring (302) and base surface (303) resists relative motion. Spring (501) resides in receiving portion (210). Spring (701) resides in receiving portion (310). Portion (607) is offset from the exis of rotation of member (604). A load is applied to or driven by the output member through member (607).

Figure 6:
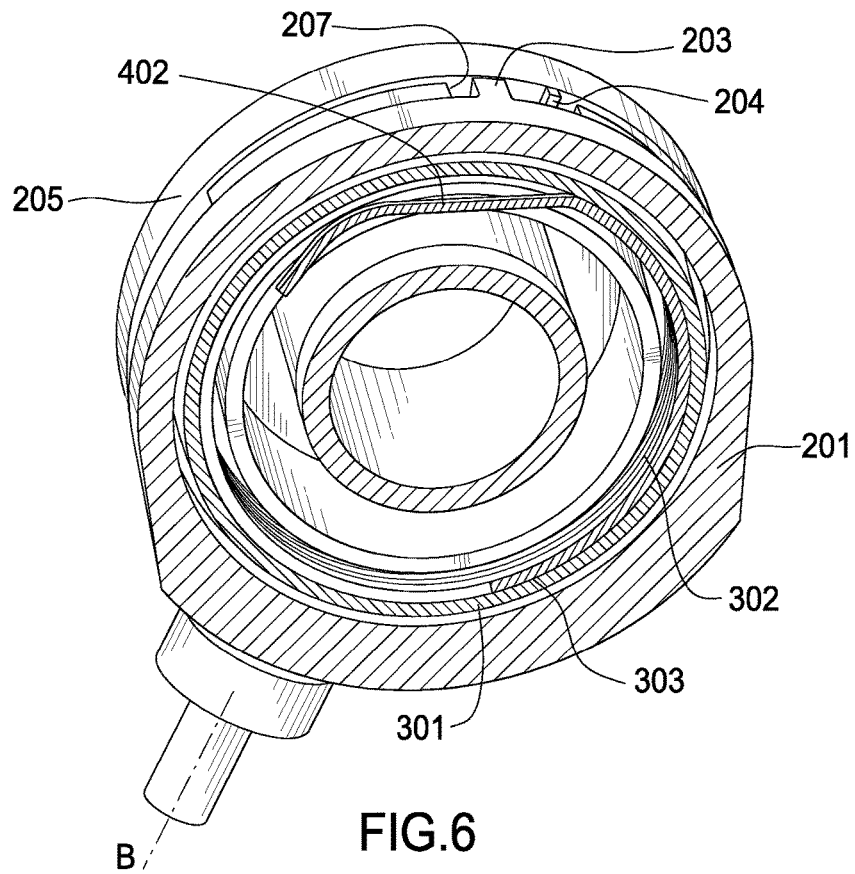
FIG. 6 is a bottom view of the device.

FIG. 6 is a bottom view of the device. The wrap spring is visible in a sectional view from within the base and the control member. Wrap spring (302) has an end (402) that is connected to intermediate member (205) by engagement with groove (212).

If intermediate member (205) is driven by an external torque in a clockwise direction the end (402) of wrap spring will be urged in a direction that causes wrap spring (302) to grip tighter against surface (303) of base (301) and thereby resist motion by intermediate member (205). However, if control member tab (203) drives the intermediate member in a counter-clockwise direction through contact with member (207), wrap spring end (402) is pulled by the intermediate member (205) such that wrap spring (302) winds tighter on itself and releases its grip on the surface (303) of base (301), and thus motion of intermediate member (205) is permitted relative to base (301). Similarly, if control member tab (203) drives in the counter-clockwise direction and contacts wrap spring tang (204), wrap spring (302) will wind tighter on itself and release its grip on the surface (303) of base (301). By rotating further in the counter-clockwise direction control member tab (203) will contact member (206) and urge it to rotate relative to base (301) with relative motion permitted by release of the wrap spring grip.

Figure 7:
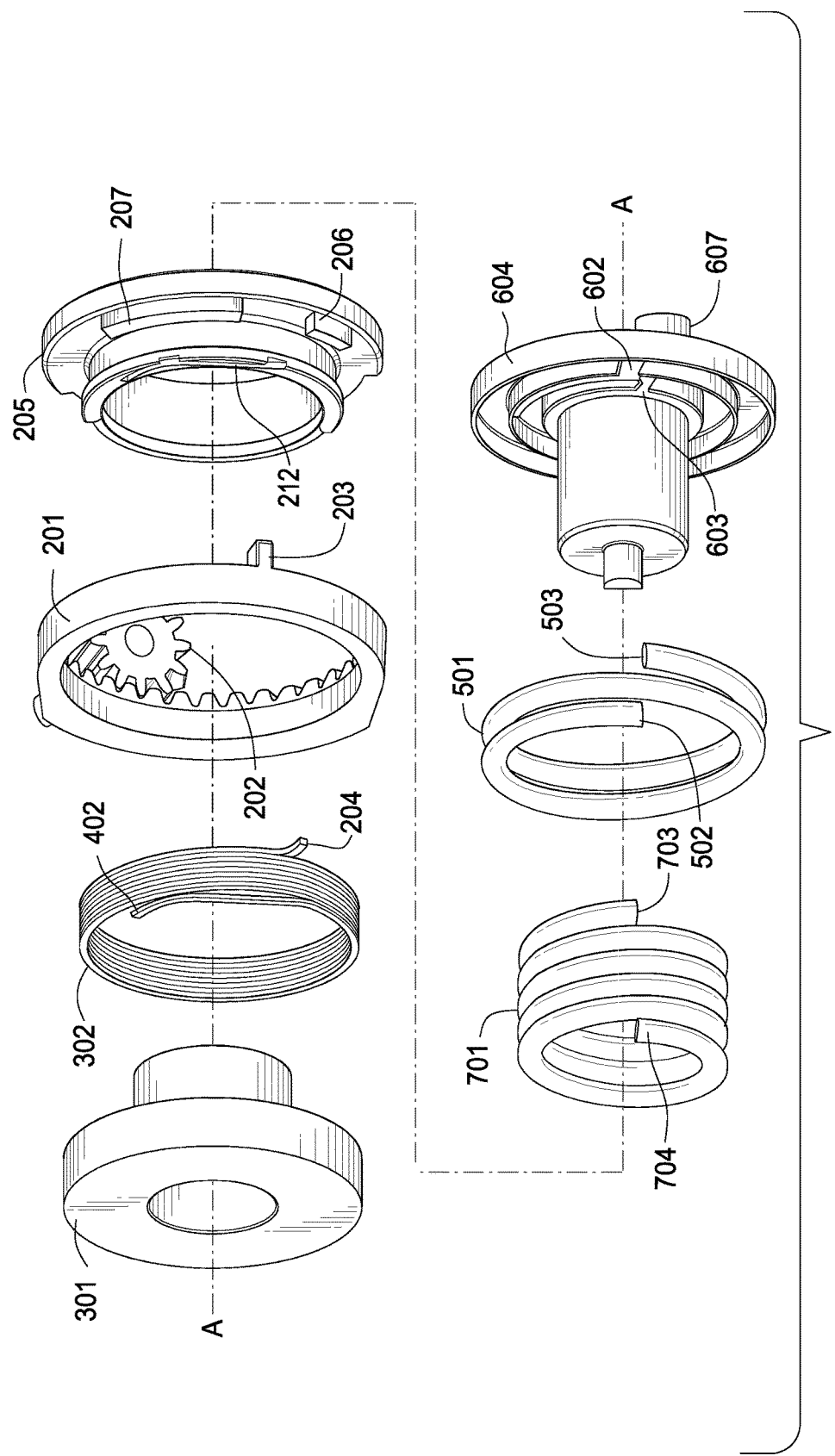
FIG. 7 is an exploded view of the device from below.

FIG. 7 is an exploded view of the device from below. Torsion spring (701) is engaged between stop (304) on base (301) and stop (603) on output member (604). Spring (701) is loaded in an unwinding direction when a positive hubload is applied to output member (604). Torsion spring (501) is engaged between stop (208) on member (205) and stop (602) on output member (604). Spring (501) is loaded in an unwinding direction. End (402) engages member (205) at receiving portion (212). Receiving portion (212) comprises a groove into which end (402) is pressed.

In a load neutral condition wherein there is no hubload the force of spring (701) equates to the force of spring (501). As a hubload is applied to the output member (604), for example by a belt (not shown), the sum of the spring forces equals the hubload (HL).

$$SF_{701}+(-SF_{501})=HL$$

Spring force $SF_{501}$ has a negative sign since it loads in the opposite direction from spring (701). Put another way, the force of spring (501) can be used to temporarily increase the apparent hubload thereby causing output member (604) to increase it rotation range in a loading direction. Spring force $SF_{501}$ of spring (501) is applied through rotation of intermediate member (205).

The total spring force applied by spring (501) is a function of the position of intermediate member (205) which in turn controls the position of stop (208). The relative position of stop (208) with respect to stop (602) determines the spring force exerted by spring (501) against the spring force for spring (701).

Figure 8:
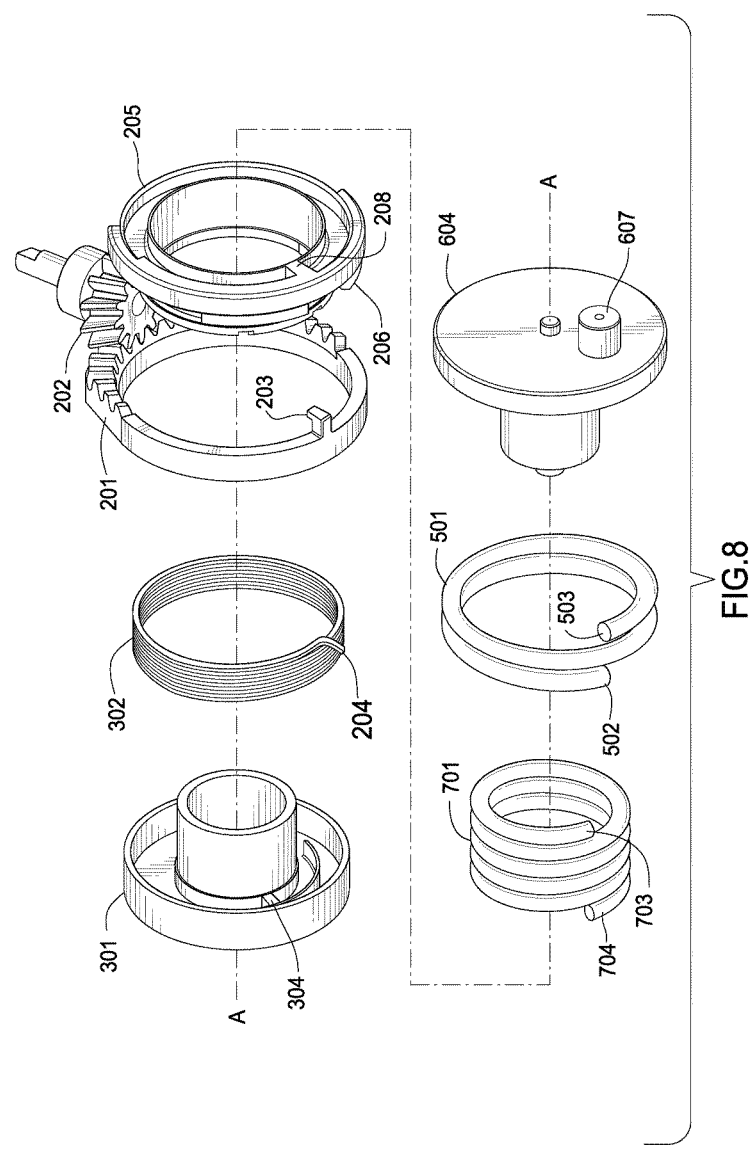
FIG. 8 is an exploded view of the device from above.

FIG. 8 is an exploded view of the device from above. A self-locking mechanism comprising a base, an output member journalled to the base, a first spring engaged between the base and the output member, the first spring exerting a first spring force in a first direction, a clutch spring engaged with an intermediate member and frictionally engaged with a base cylindrical surface, an input member rotationally engaged with the base, the input member intermittently engagable with the clutch spring through a control member such that the clutch spring is temporarily released from the base cylindrical surface upon a rotary movement of the control member in a first direction, the intermediate member rotates upon release of the clutch spring from the base cylindrical surface, and a second spring engaged between the intermediate member and the output member, the second spring exerting a second spring force opposite the first spring force.

A self-locking mechanism comprising a base, a output member journalled to the base, a first spring engaged between the base and the output member, the first spring exerting a first spring force in a first direction, a clutch spring engaged with an intermediate member and frictionally engaged with a base cylindrical surface, an input member rotationally engaged with the base, the input member intermittently engagable with the clutch spring through a control member such that the clutch spring is temporarily released from the base cylindrical surface upon a rotary movement of the control member in a first direction, the intermediate member rotates upon release of the clutch spring from the base cylindrical surface, and a second spring engaged between the intermediate member and the output member, the second spring exerting a second spring force opposite the first spring force.

Although a form of the invention has been described herein, it will be obvious to those skilled in the art that variations may be made in the construction and relation of parts and method without departing from the spirit and scope of the invention described herein.

We claim:

1. A self-locking clutch mechanism comprising:
a base (301);
an output member (604) journalled to the base;
a first spring (701) engaged between the base and the output member, the first spring exerting a first spring force in a first direction;
a clutch spring (302) engaged with an intermediate member (205) and frictionally engaged with a base cylindrical surface (303);
an input member (202) rotationally engaged with the base;
the input member (202) intermittently engagable with the clutch spring through a control member (201) such that the clutch spring is temporarily released from the base cylindrical surface upon a rotary movement of the control member in the first direction;
the intermediate member rotates upon release of the clutch spring from the base cylindrical surface, the clutch spring is releasable from the base cylindrical surface upon the intermediate member being urged by the control member in a second direction opposite the first direction; and
a second spring (501) engaged between the intermediate member and the output member, the second spring exerting a second spring force opposite the first spring force.

2. The mechanism as in claim 1, wherein the input mechanism comprises bevel gears engaged with the control member.

3. The mechanism as in claim 1, wherein the first spring comprises a torsion spring loaded in an unwinding direction.

4. The mechanism as in claim 1, wherein the second spring comprises a torsion spring loaded in an unwinding direction.

5. The self-locking clutch mechanism as in claim 1, wherein the clutch spring radially expands to frictionally engage the base cylindrical surface.

6. The self-locking clutch mechanism as in claim 1, wherein the clutch spring comprises a coil.

* * * * *